Nov. 9, 1965   W. E. BARNES   3,216,256

RADIATOR LEVEL INDICATOR

Filed Oct. 4, 1962

INVENTOR.
William E. Barnes
BY
George E. Johnson
ATTORNEY

United States Patent Office

3,216,256
Patented Nov. 9, 1965

3,216,256
RADIATOR LEVEL INDICATOR
William E. Barnes, Davison, Mich., assignor to General Motors Corporation, Detroit, Mich., a corporation of Delaware
Filed Oct. 4, 1962, Ser. No. 228,310
3 Claims. (Cl. 73—306)

This invention relates to level indicators and more particularly to indicators in combination with a pressure cap suitable for use on the filler necks of automobile radiators.

In days gone by, automobile internal combustion engines were generally cooled by circulating engine coolant maintained approximately at atmospheric pressure. In modern automobiles, the cooling systems have been found not sufficiently effective unless maintained at a rather high pressure, sometimes as high as 35 pounds per square inch. With the old time radiators, it was a simple mattter to install an indicator in the radiator cap or radiator neck closure visually to indicate that the quantity of engine coolant in the radiator top tank was adequate or below requirements. With the advent of pressurized systems, however, level indicating problems arose as radiator caps suitable for pressurized systems are quite complex and they generally involve resilient valve means serving to relieve the pressure if it becomes excessive and additional valve means to relieve excessive vacuum in the system if such condition should obtain. With pressurized systems, and despite these problems, it has become increasingly necessary that the coolant level be properly maintained and that a clear indication of the coolant level situation be at hand at all times.

An object of the present invention is to provide a radiator neck cap of the pressurized and vacuum relief type in combination with a visual indicator of coolant level.

To this end, a feature of the present invention is a transparent cover element in a radiator cap of the pressurized type, a float being provided to position an indicator for viewing through the cover element in accordance with engine coolant level.

This and other important features of the invention will now be described in detail in the specification and then pointed out more particularly in the appended claims.

Figure 1:
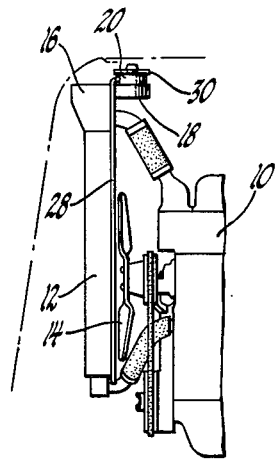
FIGURE 1 is an elevation view of the front portion of an automobile engine and a radiator associated therewith.

FIGURE 1 shows an engine at 10 as served by a radiator 12 and a conventional belt driven fan 14. The head tank 16 of the radiator is provided with a rearwardly projecting portion 18 having a filler neck 20 carrying conventional cam means 22 and an inside annular shoulder 24 bearing an annular rib 26 adapted to constitute a valve seat. The neck 20 is apertured to receive an overflow tube indicated at 28.

A radiator cap arrangement is disclosed in the drawings which is much like that of United States Patent 2,164,450, granted July 4, 1939, in the names of J. E. Eshbaugh and N. Walker. It is similar in that it has an outer cover or closure member 30 which is adapted to be fastened, upon rotation, to the neck 20 by means of tongues 32 coacting with the filler pipe flange or cam means 22. It is also similar in that it has an inner coil spring 34 acting between the cap 30 and a tubular portion 36. The tubular portion carries annular valve means generally indicated at 38 and this valve means is adapted to engage the rib 26 in the radiator neck because of the compression in the spring 34. The tubular portion 36 includes an apertured and depending cylinder 40 which is adapted to be inserted and retracted from the filler opening 42 of the radiator assembly when the cover member 30 is attached or removed from the neck 20. The tubular portion bears two diagonally opposed and depending tabs 44 and 46 and an annular top wall 48. The cylinder portion 40 is formed with a top wall 50 and this wall is apertured as at 53.

The cover member 30 is centrally depressed as at 51 and is drilled centrally thereby tightly to receive a reduced portion 52 of a hollow stem 54. The latter bears an annular rib 56 which is notched to receive the tabs 44 and 46.

A rod 59 is slidable within the stem 54 and connects a brightly colored indicator means 58 to a float 60 located within the cylindrical portion 40. A reduced portion 62 of the stem 54 slidably carries a rubber sealing member 64 which is in the form of a yielding disk valve held by the radial or top wall 50 and carries a yielding annular disk 66 controlling the apertures 53. The disk 66 with the apertured wall 50 constitutes vacuum relief means located within the tubular portion 36 and slidable on the hollow stem 54 to move with the annular valve means 38.

A transparent member 70 which may be of glass or plastic bears an annular flange 72 and the latter is held within the cover member 30 by sealing members 74 and 76.

Figure 2:
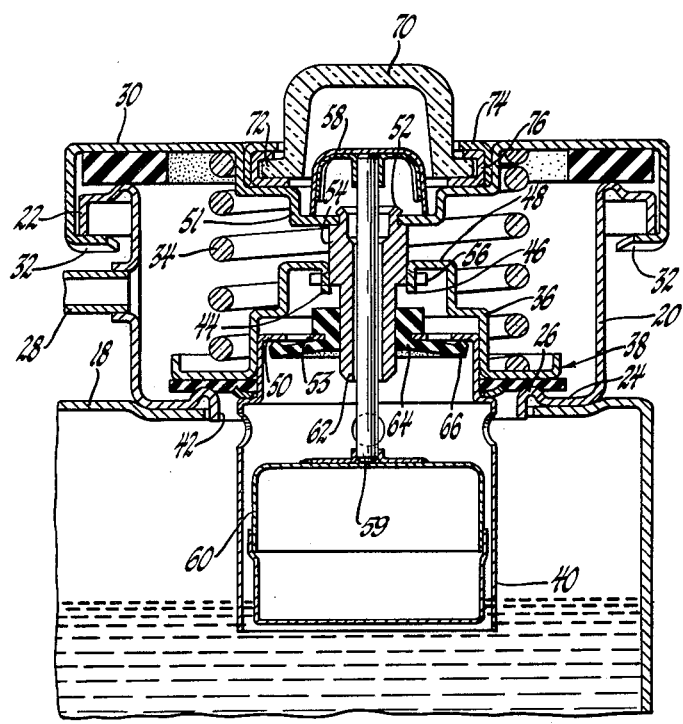
FIGURE 2 is a sectional view through a portion of the radiator as shown in FIGURE 1 and through a radiator level indicator in which the present invention is embodied, this section being drawn to an enlarged scale as compared with that of the view of FIGURE 1.
Figure 3:
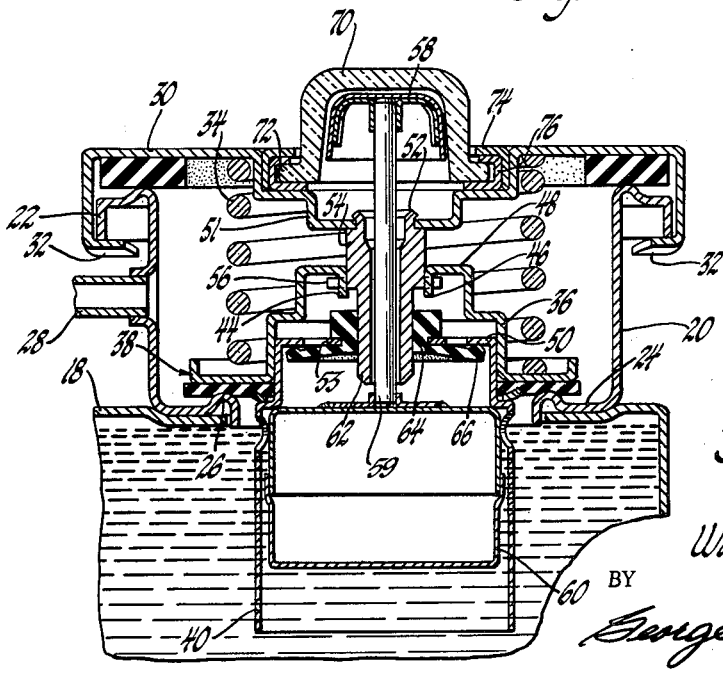
FIGURE 3 is a view similar to that of FIGURE 2 but with the parts positioned indicating a normal or high engine coolant level.

With the radiator level indicator arrangement installed on an engine coolant system as seen in FIGURE 2 and assuming that the liquid level is low, the float 60 will have lowered to the position shown thereby causing the indicator element 58 to lower within the transparent member 70. This constitutes a positive and immediate indication of low coolant level. On the other hand, if the liquid level is as shown in FIGURE 3 and the normal operative condition obtains, the float will have risen and the indicator element 58 will be clearly apparent to the operator.

I claim:

1. A coolant level indicator for automobile radiators having a filler neck with an overflow connected to said neck above an annular inner shoulder in the latter, said indicator comprising a detachable cover member for sealing said neck, a transparent element forming a central part of said cover member and adapted as such to contribute in the sealing of said neck, a hollow stem fixed to and depending from said cover member, a tubular portion slidable on said stem and carrying annular valve means adapted yieldingly to engage said inner shoulder, a float movable in said tubular portion and arranged beneath said annular valve means, vacuum relief means surrounding said hollow stem and located within said tubular portion, indicating means movable in said transparent element, and a rod slidable in said hollow stem and connecting said float to said indicating means.

2. A coolant level indicator comprising a detachable cover member for a radiator neck, a transparent element forming an integral and central part of said cover member for sealing said radiator neck, a hollow stem fixed to and depending from said cover member, a tubular portion slidable on said stem and carrying annular valve means midway its length, a float movable in said tubular portion and arranged beneath said annular valve means, indicating means movable in said transparent element, a vacuum relief valve arrangement being movable with said tubular portion and slidable on said hollow stem, and a rod slidable in said hollow stem connecting said float to said indicating means.

3. A coolant level indicator for automobile radiators having a filler neck with an overflow connected to said neck above an annular inner shoulder in the latter, said indicator comprising a detachable cover member for sealing said neck, an inverted cuplike transparent element forming a central part of said cover member and extending upwardly from the latter as a contributing factor for sealing said neck, a hollow stem fixed to and depending from said cover member and transparent element, a tubular portion having a radial wall slidable on said stem and carrying annular valve means adapted yieldingly to engage said inner shoulder and also vacuum relief means slidable on a portion of said hollow stem within said tubular portion, a float movable in said tubular portion and arranged beneath said annular valve means and vacuum relief means, indicating means movable in a path extending into said transparent element, and a rod slidable in said hollow stem and connecting said float to said indicating means.

References Cited by the Examiner
UNITED STATES PATENTS

| | | | |
|---|---|---|---|
| 1,173,117 | 2/16 | Obermann | 73—322 |
| 1,679,451 | 8/28 | Van Duzer | 73—322 |
| 2,484,163 | 10/49 | Gosheff | 73—306 |
| 2,968,421 | 1/61 | Eshbaugh | 220—40 |

ISAAC LISANN, *Primary Examiner.*